United States Patent [19]

Krull et al.

[11] Patent Number: 5,789,510
[45] Date of Patent: Aug. 4, 1998

[54] TERPOLYMERS OF ETHYLENE, THEIR PREPARATION AND THEIR USE AS ADDITIVES FOR MINERAL OIL DISTILLATES

[75] Inventors: Matthias Krull, Oberhausen; Werner Reimann, Frankfurt, both of Germany

[73] Assignee: Hoechst Aktiengesellschaft, Germany

[21] Appl. No.: 859,820

[22] Filed: May 19, 1997

[30] Foreign Application Priority Data

May 18, 1996 [DE] Germany ............... 196 20 119.5

[51] Int. Cl.[6] ............... C08F 232/08; C08F 218/08; C08F 210/02
[52] U.S. Cl. ............... 526/281; 526/330; 526/331; 526/348
[58] Field of Search ............... 526/281, 330, 526/331, 348

[56] References Cited

U.S. PATENT DOCUMENTS 3,388,977 6/1968 Burkard .
4,372,863 2/1983 Elliott ............... 508/221

FOREIGN PATENT DOCUMENTS

| 1 271 895 | 7/1990 | Canada . |
| 0203554 | 5/1986 | European Pat. Off. . |
| 0184048 | 6/1986 | European Pat. Off. . |
| 0463518 | 6/1991 | European Pat. Off. . |
| 0493769 | 12/1991 | European Pat. Off. . |
| 2100058 | 7/1971 | Germany . |

OTHER PUBLICATIONS

European Search Report EP 97 10 7687 with Annex.

*Primary Examiner*—Fred Zitomer
*Attorney, Agent, or Firm*—Bierman, Muserlian and Lucas

[57] ABSTRACT

Terpolymers obtained by copolymerization of ethylene, a vinyl ester of at least one aliphatic monocarboxylic acid of 2 to 20 carbon atoms in the molecule and bicyclo[2.2.1]hept-2-ene (also referred to as norbornene) or its derivatives, a process for their preparation and their use as additives for mineral oils and mineral oil distillates.

19 Claims, No Drawings

TERPOLYMERS OF ETHYLENE, THEIR PREPARATION AND THEIR USE AS ADDITIVES FOR MINERAL OIL DISTILLATES

FIELD OF THE INVENTION

The invention relates to terpolymers of ethylene, a vinyl ester of at least one aliphatic monocarboxylic acid of 2 to 20 carbon atoms in the molecule and bicyclo[2.2.1]hept-2-ene (also referred to as norbornene) or bicyclo [2.2.1]hept-2-ene derivatives, said terpolymer having a melt viscosity measured at 140° C. of 20 to 10.000 mPa·s useful for improving the flowability of mineral oils and mineral oil distillates.

STATE OF THE ART

Crude oils and middle distillates obtained by distillation of crude oils, for example gas oil, diesel oil or heating oil, contain, depending on the origin of the crude oils, differing amounts of long-chain paraffins (waxes) in dissolved form. At low temperatures, these paraffins precipitate as platelet-shaped crystals, sometimes with inclusion of oil. This considerably impairs the flowability of the crude oils and the distillates obtained therefrom. Deposits of solids occur, and these frequently lead to problems in recovery, transport and use of the mineral oils and mineral oil products. Thus, at low ambient temperatures, e.g. during the cold time of year, blockages occur in the filters of, inter alia, diesel engines and furnaces. These blockages prevent reliable metering of the fuels and finally result in interruption of the fuel supply. The conveying of the mineral oils and mineral oil products through pipelines over relatively great distances can also be impaired, for example in winter by precipitation of paraffin crystals.

It is known that undesired crystal growth can be suppressed by suitable additives and a rise in the viscosity of the oils can thus be counteracted. Such additives, which are known as pour point depressants or flow improvers, change the size and shape of the wax crystals and thus counteract a rise in the viscosity of the oils.

The flow and cold behavior of mineral oils and mineral oil distillates is described by the pour point (determined in accordance with ISO 3016) and the cold filter plugging point (CFPP; determined in accordance with EN 116). Both parameters are measured in °C.

Typical flow improvers for crude oils and middle distillates are copolymers of ethylene with carboxylic esters of vinyl alcohol. Thus, according to DE 11 47 799 B1, oil-soluble copolymers of ethylene and vinyl acetate having a molecular weight between about 1,000 and 3,000 are added to petroleum distillate fuels having a boiling range of about 120° and 400° C. Preference is given to copolymers comprising about 60 to 99% by weight of ethylene and about 1 to 40% by weight of vinyl acetate. They are particularly effective if they have been prepared by free-radical polymerization in an inert solvent at temperatures of about 70° to 130° C. and pressures of about 35 to 2,100 atm gauge pressure (DE 19 14 756 B2).

Other polymers useful as flow improvers comprise, in addition to ethylene and vinyl acetate, for example 1-hexene (cf. EP 0 184 083 B1), diisobutylene (cf. EP 0 203 554 B1) or an isoolefin of the formula

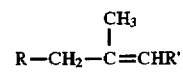

where R and R' are individually hydrogen or alkyl of 1 to 4 carbon atoms (EP 0 099 646 A1). Terpolymers of ethylene, vinyl acetate and vinyl neononanoate or vinyl neodecanoate as additives for mineral oil distillates are disclosed in EP 0 493 769 B1. Copolymers of ethylene, alkenecarboxylic esters and/or vinyl esters and vinyl ketone are also used as pour point depressants and for improving the flow behavior of crude oils and middle distillates of the crude oils (cf. EP 0 111 883 B1).

The effectiveness of the known additives for improving the properties of mineral oil fractions is dependent, inter alia, on the origin of the mineral oil from which they have been obtained and thus, in particular, on the composition of the latter. Therefore, additives which are very well suited to setting certain property values of fractions of one crude oil can lead to completely unsatisfactory results in distillates of crude oils having a different origin.

Additives which have a wide range of application, i.e. significantly improve the low-temperature flow properties of mineral oils and mineral oil fractions of different origin, are now available. Nevertheless, there are cases in which they prove to be of little or no utility, either because they contribute only a little to increasing the flowability when cold or because they impair the filterability of mineral oil distillates above the cloud point. There are many reasons for this: the development of raw materials not previously used, the altered processing of the primary products and new market requirements may be mentioned as examples. In addition, the known flow improvers themselves have a high pour point. As a result of this property, at low ambient temperatures, they have to be stored in heated tanks and/or be employed as highly dilute solutions.

OBJECTS OF THE INVENTION

It is therefore an object of the invention to develop new additives for improving the flowability of those types of petroleum or petroleum fractions in which the additives of the prior art have only an unsatisfactory effect, which in addition can be handled without difficulty at low ambient temperatures and ensure sufficient filterability of petroleum distillates above the cloud point.

It is another object of the invention to provide novel pour point depressant compositions and to provide improved mineral oil and mineral oil distillates with good pour point properties.

These and other objects and advantages of the invention will become obvious from the following detailed description.

THE INVENTION

The novel terpolymers of the invention are comprised of ethylene, the vinyl ester of one or more aliphatic, linear or branched monocarboxylic acids containing 2 to 20 carbon atoms in the molecule and norbornene or norbornene derivatives, as a single compound or as a mixture of two or more of these compounds, having a proportion of from 10 to 35% by weight of vinyl ester and from 0.5 to 20% by weight of norbornene or norbornene derivatives (in each case based on the terpolymer) and a melt viscosity measured at 140° C. of from 20 to 10,000 mpa·s.

As regards the material composition of the new terpolymers, it should be noted that the vinyl esters of aliphatic monocarboxylic acids are according to the invention counted as one monomer component, regardless of whether one or more vinyl esters of monocarboxylic acids of 2 to 20 carbon atoms is present in the terpolymers. The same also applies to norbornene derivatives which can be present in the terpolymer as a uniform compound or as a mixture of two or more different compounds.

The invention also provides for the use of the above-described terpolymers for improving the flowability of mineral oils and, in particular, mineral oil distillates.

Surprisingly, the terpolymers of the invention have been found to be very useful for improving the flowability of mineral oils and mineral oil distillates including those whose flow behavior could be only insufficiently influenced using the additives of the prior art. A further valuable property of the new terpolymers is their low intrinsic pour point in organic solvents. It is significantly below the pour point of ethylene/vinyl ester copolymers. For this reason, the new terpolymers can be stored in unheated tanks even at low outside temperatures and be used without prior warming. Particular mention should also be made of their significantly lower mixing-in temperature compared with comparable copolymers of the prior art, which leads to improved filterability of the middle distillates containing them above the cloud point.

In principle, the terpolymers of the invention can be used as flow improvers both in crude oils and in the downstream products of the crude oils obtained by distillation. However, they are preferably used in mineral oil distillates, particularly mineral oil middle distillates, viz. hydrocarbon fractions boiling between 150° and 400° C. Examples of such crude oil distillates are kerosine, light heating oils and diesel fuel. Of particular importance are middle distillates such as heating oil EL and diesel fuel.

The norbornene content of the terpolymer is determined by means of $^{13}$C-NMR spectroscopy. For this purpose, the integral of the norbornene-$C_2$ signal at 47–51 ppm is compared with the integral of the ethylene and remaining norbornene carbon atoms in the range from 7 to 43 ppm.

Particularly suitable for use as flow improvers are terpolymers of the invention having a melt viscosity measured in accordance with ISO 3219(B) at 140° C. of from 50 to 5,000 mPa·s, preferably from 30 to 1,000 mPa·s and more preferably from 50 to 500 mPa·s. Terpolymers of relatively high melt viscosity are preferably added to crude oils and those of relatively low melt viscosity are preferably added to middle distillates.

The preparation of the terpolymers of the invention comprising ethylene, a vinyl ester of an aliphatic linear or branched monocarboxylic acid of 2 to 20 carbon atoms in the molecule and bicyclo[2.2.1]hept-2-ene or its derivatives starts out from mixtures of the monomers. Solid monomers such as norbornene can, for better metering in, advantageously be metered in as a solution (10–95% strength) in inert organic solvents such as toluene or xylene. Norbornene and its derivatives can be obtained from cyclopentadiene and acyclic olefins by the Diels-Alder synthesis according to the equation

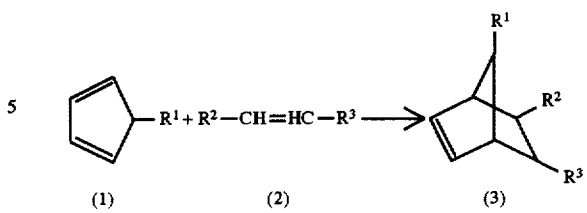

$R^1$, $R^2$ and $R^3$ in the above reaction equation (I) can individually be hydrogen or alkyl. Preferred monomer components in the terpolymers of the invention are norbornenes of formula (3) in which $R^1$, $R^2$ and $R^3$ are individually hydrogen or straight-chain or branched alkyl of up to 20 carbon atoms such as methyl, ethyl, propyl, i-propyl, pentyl, octyl, 2-ethylhexyl, decyl, dodecyl and octadecyl. Particular preference as monomer components is given to norbornene and 5-methylnorbornene.

The vinyl esters of the aliphatic monocarboxylic acids are commercial products and a common way of preparing them is the reaction of carboxylic acids with acetylene (cf. Ullmanns Encyclopädie der Technischen Chemie, 4th Edition, Vol. 23, p. 598 ff). The acid component of the esters can be linear or branched and preference is given to the vinyl esters of acetic acid, propionic acid, isomeric butyric acids, lauric acid, neononanoic acid and neodecanoic acid, more preferably vinyl acetate.

The copolymerization of the starting materials is carried out by known methods (cf. Ullmanns Encyclopädie der Technischen Chemie, 4th Edition, Vol. 19, pp. 169 to 178). Suitable methods are polymerization in solution, in suspension, in the gas phase and high-pressure bulk polymerization. Preference is given to using high-pressure bulk polymerization which is carried out at pressures of 50 to 400 MPa, preferably from 100 to 300 MPa, and temperatures of 50° to 350° C., preferably 100° to 300° C.

The reaction of the monomers is initiated by initiators which form free radicals (free-radical chain initiators). This class of substances includes, for example, oxygen, hydroperoxides, peroxides and azo compounds such as cumene hydroperoxide, t-butyl hydroperoxide, dilauroyl peroxide, dibenzoyl peroxide, bis(2-ethylhexyl) peroxydicarbonate, t-butyl perpivalate, t-butyl permaleate, t-butyl perbenzoate, dicunyl peroxide, t-butylcumyl peroxide, di-(t-butyl) peroxide, 2,2'-azobis(2-methyl-propanonitrile), 2,2'-azobis(2-methylbutyronitrile). The initiators are used either individually or as a mixture of two or more substances in amounts of from 0.01 to 20% by weight, preferably from 0.05 to 10% by weight, based on the monomer mixture.

The desired melt viscosity of the terpolymers is, for a given composition of the monomer mixture, set by variation of the reaction parameters, pressure and temperature and, optionally, by addition of moderators. Moderators which have been found to be useful are hydrogen, saturated or unsaturated hydrocarbons, e.g. propane, aldehydes, e.g. propionaldehyde, n-butyraldehyde or iso-butyraldehyde, ketones, e.g. acetone, methyl ethyl ketone, methyl isobutyl ketone, cyclohexanone, or alcohols, e.g. butanol. Depending on the desired viscosity, the moderators are employed in amounts of up to 20% by weight, preferably from 0.05 to 10% by weight, based on the monomer mixture.

To obtain polymers of the composition of the invention, use is made of monomer mixtures comprising, apart from ethylene and if desired a moderator, of 5 to 40% by weight, preferably from 10 to 40% by weight, of vinyl ester and 0.5 to 30% by weight of norbornene or norbornene derivatives.

The use of a composition of the monomer mixture differing from the composition of the terpolymer takes account of the different polymerization rates of the monomers. The polymers are obtained as colorless melts which solidify at room temperature to give wax-like solids.

The high-pressure bulk polymerization is carried out in known high-pressure reactors, e.g. autoclave or tube reactors, batchwise or continuously. Tube reactors have been found to be particularly useful. Solvents such as aliphatic hydrocarbons or hydrocarbon mixtures, benzene or toluene can be present in the reaction mixture, although the solvent-free procedure has been found to be particularly useful. According to a preferred embodiment of the polymerization, the mixture of the monomers, the initiator and, if used, the moderator is fed to a tube reactor both via the reactor inlet and via one or more side branches. Here, the monomer streams can have different compositions (EP 0 271 738 B1).

The terpolymers of the invention are added to mineral oils or mineral oil distillates in the form of solutions or dispersions. Suitable solvents or dispersion media are aliphatic and/or aromatic hydrocarbons or hydrocarbon mixtures, e.g. naphtha fractions, kerosine, decane, pentadecane, toluene, xylene, ethylbenzene or commercial solvent mixtures such as solvent naphtha, ®Shellsol AB, ®Solvesso 150, ®Solvesso 200, ®Solvesso 250, ®Exxsol, ®ISOPAR and Shellsol D grades. Mineral oils or mineral oil distillates which have had their rheological properties improved by new polymeric compounds contain from 0.001 to 2% by weight, preferably from 0.005 to 0.5% by weight, of terpolymer based on the distillate.

The terpolymers of the invention can also be used as flow improvers in the form of mixtures comprising polymers of the type of the invention, but having a different qualitative and/or quantitative composition and/or a different viscosity (measured at 140° C.). Such mixtures comprise, for example, polymers having the same proportion of vinyl ester but a different proportion of ethylene/norbornene/norbornene derivative. The mixing ratio (in parts by weight) of the two components can be varied over a wide range and can be, for example, 20:1 to 1:20, preferably 10:1 to 1:10. In this way, flow improvers can be matched to individual requirements in a targeted manner.

With the same result of optimizing the effectiveness as flow improvers for certain substrates, the polymers of the invention can also be used together with one or more oil-soluble co-additives which, even by themselves, improve the cold flow properties of crude oils, lubricating oils or fuel oils. Examples of such co-additives are vinyl acetate-containing copolymers or terpolymers of ethylene, polar compounds which effect dispersion of paraffins (paraffin dispersants) and comb-like polymers.

Thus, mixtures of the new terpolymers with copolymers comprising 10 to 40% by weight of vinyl acetate and 60 to 90% by weight of ethylene have been found to be very useful. According to a further embodiment of the invention, the terpolymers claimed are used in admixture with ethylene-vinyl acetate-vinyl neononanoate terpolymers or ethylene-vinyl acetate-vinyl neodecanoate terpolymers to improve the flowability of mineral oils or mineral oil distillates. The terpolymers of vinyl neononanoate or vinyl neodecanoate comprise, apart from ethylene, 10 to 35% by weight of vinyl acetate and 1 to 25% by weight of the respective neo compound. The mixing ratio of the terpolymers of the invention with the above-described ethylene-vinyl acetate copolymers or the terpolymers of ethylene, vinyl acetate and the vinyl esters of neononanoic or neodecanoic acid is (in parts by weight) from 20:1 to 1:20, preferably from 10:1 to 1:10.

For use as flow improvers, the new terpolymers can also be used in admixture with paraffin dispersants. These additives reduce the size of the paraffin crystals and have the effect of the paraffin particles not settling but remaining colloidally dispersed with a significantly reduced sedimentation tendency. Paraffin dispersants which have been found to be useful are oil-soluble polar compounds containing ionic or polar groups, e.g. amine salts and/or amides which are obtained by reaction of aliphatic or aromatic amines, preferably long-chain aliphatic amines, with aliphatic or aromatic monocarboxylic, dicarboxylic, tricarboxylic or tetracarboxylic acids or their anhydrides (cf. U.S. Pat. No. 4,211,534). Other paraffin dispersants are copolymers of maleic anhydride and $\alpha,\beta$-unsaturated compounds which can, if desired, be reacted with primary monoalkylamines and/or aliphatic alcohols (cf. EP 0 154 177), the reaction products of alkenylspirobislactones with amines (cf. EP 0 413 279 B1) and, according to EP 0 606 055 A2, reaction products of terpolymers based on $\alpha,\beta$-unsaturated dicarboxylic acid anhydrides, $\alpha,\beta$-unsaturated compounds and polyoxyalkylene ethers of lower unsaturated alcohols.

Finally, in a further preferred variant of the invention, the new terpolymers are used together with comb-like polymers as flow improvers. Comb-like polymers are polymers in which hydrocarbons of at least 8, particularly at least 10, carbon atoms are bound to a polymer backbone. They are preferably homopolymers whose alkyl side chains contain at least 8 and particularly at least 10 carbon atoms. In the case of copolymers, at least 20%, preferably at least 30%, of the monomers have side chains (cf. Comb-like polymers—Structure and Properties; N. A. Plate and V. P. Shibaev, J. Polym. Sci. Macromolecular Revs. 1974, 8, 117 ff). Examples of suitable comb-like polymers are fumarate-vinyl acetate copolymers (cf. EP 0 153 176 A1), copolymers of a $C_6$–$C_{24}$-$\alpha$-olefin and an N-$C_6$–$C_{22}$-alkylmaleimide (cf. EP 0 320 766), also esterified olefin/maleic anhydride copolymers, polymers and copolymers of $\alpha$-olefins and esterified copolymers of styrene and maleic anhydride.

The mixing ratio (in parts by weight) of the terpolymers of the invention with paraffin dispersants or comb-like polymers is, in each case, 1:10 to 20:1, preferably 1:1 to 10:1. The new terpolymers and their mixtures with one another and with co-additives can be used alone or together with other additives, for example with dewaxing auxiliaries, corrosion inhibitors, antioxidants, lubricity additives or sludge inhibitors.

In the following examples, there are described several preferred embodiments to illustrate the invention. However, it is to be understood that the invention is not intended to be limited to the specific embodiments.

EXAMPLES

Preparation of ethylene-vinyl carboxylate-norbornene terpolymers (Examples 1–7) or ethylene-vinyl carboxylate-5-methylnorbornene terpolymers (Examples 8 and 9)

Ethylene, vinyl acetate (Vina) and norbornene or 5-methylnorbornene were polymerized with addition of propionaldehyde as a molecular weight regulator (moderator) in a continuously operated high-pressure autoclave having a capacity of 0.6 liters. For this purpose, the monomer mixture to which bis-(2-ethylhexyl) peroxydicarbonate dissolved in white spirit (15% strength by weight solution) had been added as initiator was fed into the reactor under a reaction pressure of 150 MPa at 160° C. Norbornene or 5-methylnorbornene was metered in as a 75% strength solution in toluene and the residence time of the reactants in the autoclave was about 120 seconds. The polymerization conditions are shown in Tables 1a and 1b and the properties of the terpolymers obtained are shown in Table 1c.

The vinyl acetate content was determined by pyrolysis of the polymer. For this purpose, 100 mg of the polymer together with 200 mg of pure polyethylene were thermally dissociated in a pyrolysis flask for 5 minutes at 450° C. in a closed system under vacuum and the dissociation gases were collected in a 250 ml round-bottom flask. The dissociation product, acetic acid, was reacted with NaI/KIO$_3$ solution and the iodine liberated was titrated with Na$_2$S$_2$O$_3$ solution.

The norbornene content or 5-methylnorbornene content in the polymers was determined by $^{13}$C-NMR spectroscopy (measured in C$_2$D$_2$Cl$_4$ at 333K using a 75.47 MHz spectrometer MSL 300 from Bruker). The viscosity was measured in accordance with ISO 3219 (B) using a rotation viscometer (Haake RV 20) with a cone-and-plate measurement system at 140° C.

TABLE 1a

Preparation of norbornene terpolymers

| Example No. | Feed (% by weight) | | | Initiator (ppm by weight based on ethylene) | Moderator (% by weight based on monomers) | Yield |
| --- | --- | --- | --- | --- | --- | --- |
| | C$_2$H$_4$ | Vina | Norbornene | | | |
| 1 | 57 | 27 | 16 | 565 | 4.0 | 9.0% |
| 2 | 55.5 | 27 | 13.5 | 525 | 4.0 | 9.2% |
| 3 | 56.5 | 30 | 13.5 | 675 | 3.8 | 10.5% |
| 4 | 62 | 27 | 11 | 300 | 4.0 | 7.7% |
| 5 | 59 | 30 | 11 | 375 | 3.8 | 8.7% |
| 6 | 56 | 33 | 11 | 360 | 3.9 | 8.8% |
| 7 | 58.5 | 33 | 8.5 | 320 | 4.4 | 8.6% |

TABLE 1b

Preparation of 5-methylnorbornene terpolymers

| Example No. | Feed (% by weight) | | | Initiator (ppm by weight based on ethylene) | Moderator (% by weight based on monomers) | Yield |
| --- | --- | --- | --- | --- | --- | --- |
| | C$_2$H$_4$ | Vina | 5-methyl-norbornene | | | |
| 8 | 59 | 31 | 10 | 1,500 | 4.1 | 10.7% |
| 9 | 63 | 32 | 5 | 550 | 3.7 | 9.5% |

TABLE 1c

Characterization of the terpolymers

| Example No. | Vina (% by weight) | V$_{140}$ (mPa · s) | Cycloolefin |
| --- | --- | --- | --- |
| 1 | 24.6 | 100 | 14.8% of norbornene |
| 2 | 24.0 | 99 | 12.4% of norbornene |
| 3 | 27.7 | 111 | 12.2% of norbornene |
| 4 | 24.6 | 108 | 10.2% of norbornene |
| 5 | 27.1 | 121 | 9.9% of norbornene |
| 6 | 30.1 | 112 | 9.5% of norbornene |
| 7 | 28.7 | 103 | 7.7% of norbornene |
| 8 | 29.3 | 106 | 10.4% of methylnorbornene |
| 9 | 29.4 | 136 | 5.7% of methylnorbornene |

The effectiveness of the new terpolymers was compared with the effectiveness of commercial flow improvers, namely with an ethylene-vinyl acetate copolymer (EVA copolymer) containing 28% by weight of vinyl acetate and having a melt viscosity V$_{140}$ of 290 mPas and an ethylene-vinyl acetate-diisobutylene terpolymer (DIB terpolymer) containing 28% by weight of vinyl acetate with a melt viscosity V$_{140}$ of 275 mpa·s and a short-chain branching of 8 CH$_3$ groups per 100 CH$_2$ groups of the polyethylene.

Handleability of the Terpolymers

The measure used for the handleability of the polymers of the invention was their pour point measured in accordance with ISO 3016 on 50% strength by weight dispersions in kerosine or 20% strength by weight solutions in solvent naphtha (SN).

TABLE 2

| | 20% in SN | 50% in kerosine |
| --- | --- | --- |
| Example 1 | −30° C. | −9° C. |
| Example 2 | −24° C. | +3° C. |
| Example 3 | −33° C. | −6° C. |
| Example 4 | −18° C. | 0° C. |
| Example 5 | −21° C. | 0° C. |
| Example 6 | −27° C. | −6° C. |
| Example 7 | −18° C. | 0° C. |
| Example 8 | −36° C. | −9° C. |
| Example 9 | −12° C. | 9° C. |
| E–VA | −9° C. | +18° C. |
| E–VA–DIB | −15° C. | +6° C. |

Characterization of the Test Oils

The behavior of the new terpolymers as cold flow improvers for mineral oils was tested on test oils 1 to 4 whose properties are shown in Table 3.

TABLE 3

| | Test oil 1 | Test oil 2 | Test oil 3 | Test oil 4 |
| --- | --- | --- | --- | --- |
| Commencement of boiling | 187° C. | 185° C. | 186° C. | 184° C. |
| 30% | 248° C. | 261° C. | 239° C. | 271° C. |
| 90% | 330° C. | 359° C. | 331° C. | 329° C. |
| End of boiling | 358° C. | 380° C. | 349° C. | 353° C. |
| Cloud point | −7° C. | 2.9° C. | −7.5° C. | −5° C. |
| CFPP | −12° C. | 0° C. | −9° C. | −9° C. |

Effectiveness of the Terpolymers

Table 4 indicates the effectiveness of the ethylene-vinyl acetate-norbornene terpolymers obtained as described in the preparative examples as additives for mineral oils and mineral oil distillates according to the CFPP test (cold filter plugging test in accordance with EN 116). The additives were used either as 50% strength suspensions in kerosine or as 20% strength by weight solutions in solvent naphta:

TABLE 4

|  | Test oil 1 (+ 20% strength additive) | | | Test oil 2 (+ 50% strength additive) | | | Test oil 3 (+ 50% strength additive) | | |
| --- | --- | --- | --- | --- | --- | --- | --- | --- | --- |
|  | 300 ppm | 500 ppm | 1000 ppm | 100 ppm | 200 ppm | 400 ppm | 50 ppm | 100 ppm | 200 ppm |
| Example 1 | −18 | −19 | −23 | −4 | −11 | −13 | −12 | −14 | −24 |
| Example 2 |  |  |  | −8 | −12 | −14 | −13 | −15 | −24 |
| Example 3 |  |  |  | −4 | −10 | −14 |  |  |  |
| Example 4 | −19 | −19 | −24 | −9 | −11 | −7 | −13 | −15 | −23 |
| Example 5 | −19 | −19 | −25 | −4 | −11 | −14 | −13 | −14 | −24 |
| Example 6 |  |  |  |  |  |  | −9 | −13 | −30 |
| Example 7 | −19 | −19 | −25 | −10 | −11 | −11 | −13 | −19 | −30 |
| Example 8 | −18 | −20 | −24 | −5 | −12 | −15 | −13 | −15 | −29 |
| E-VA copolymer | −19 | −20 | −20 | −9 | −11 | −14 | −12 | −13 | −21 |
| E-VA-DIB terpolymer | −18 | −19 | −18 | −2 | −11 | −16 | −12 | −14 | −23 |

Various modifications of the compositions and method of the invention may be made without departing from the spirit or scope thereof and it is to be understood that the invention is intended to be limited only as defined in the appended claims.

What we claim is:

1. A terpolymer of ethylene, the vinyl ester of one or more aliphatic, linear or branched monocarboxylic acids containing from 2 to 20 carbon atoms in the molecule and norbornene or norbornene derivatives, as a single compound or as a mixture of two or more of these compounds, having a proportion of from 10 to 35% by weight of vinyl ester and from 0.5 to 20% by weight of norbornene or norbornene derivatives (in each case based on the terpolymer) and a melt viscosity measured at 140° C. of from 20 to 10,000 mpa·s.

2. A terpolymer of claim 1, wherein the norbornene derivative is 5-methylnorbornene.

3. A process for preparing a terpolymer of claim 1 comprising polymerizing monomer mixtures comprising, apart from ethylene, 5 to 40% by weight, of a vinyl ester of at least one aliphatic monocarboxylic acid of 2 to 20 carbon atoms in the molecule and 0.5 to 30% by weight of norbornene or norbornene derivatives (in each case based on the monomer mixture) and, optionally a moderator at pressures of 50 to 400 MPa, and temperatures of 50° to 350° C. in the presence of a free-radical chain initiator.

4. The process of claim 3, wherein the moderator is an aliphatic aldehyde or an aliphatic ketone.

5. The process of claim 4, wherein the moderator is propionaldehyde or methyl ethyl ketone.

6. The process of claim 3, wherein the moderator is employed in an amount of from 0.05 to 10% by weight, based on the monomer mixture.

7. The process of claim 3, wherein the polymerization is carried out in the presence of 0.01 to 20% by weight, based on the monomer mixture, of a free-radical chain initiator.

8. A mixture comprising terpolymers of claim 1 and an ethylene-vinyl acetate copolymer in a weight ratio of from 20:1 to 1:20.

9. A mixture of claim 8, wherein the ethylene-vinyl acetate copolymer comprises 60 to 90% by weight of ethylene and 10 to 40% by weight of vinyl acetate.

10. A mixture comprising terpolymers of claim 1 and an ethylene-vinyl acetate-vinyl neononanoate terpolymer or an ethylene-vinyl acetate-vinyl neodecanoate terpolymer in a weight ratio of from 20:1 to 1:20.

11. A mixture of claim 10, wherein the ethylene-vinyl acetate-vinyl neononanoate terpolymer or the ethylene-vinyl acetate-vinyl neodecanoate terpolymer comprise, apart from ethylene, 10 to 35% by weight of vinyl acetate and 1 to 25% by weight of vinyl neononanoate or vinyl neodecanoate.

12. A mixture comprising terpolymers of claim 1 and paraffin dispersants in a weight ratio of from 1:10 to 20:1.

13. A mixture comprising terpolymers of claim 1 and comb-like polymers in a weight ratio from 1:10 to 20:1.

14. A mineral oil or mineral oil distillate containing from 0.0005 to 1% by weight (based on the mineral oil or mineral oil distillate), of a terpolymer of claim 1.

15. A mineral oil or mineral oil distillate containing 0.001 to 0.5% by weight (based on the mineral oil distillate or mineral oil) of a mixture of claim 8.

16. A mineral oil or mineral oil distillate containing 0.001 to 0.5% by weight (based on the mineral oil distillate or mineral oil) of a mixture of claim 10.

17. A mineral oil or mineral oil distillate containing 0.001 to 0.5% by weight (based on the mineral oil distillate or mineral oil) of a mixture of claim 12.

18. A mineral oil or mineral oil distillate containing 0.001 to 1.0% by weight (based on the mineral oil distillate or mineral oil) of a mixture of claim 13.

19. A mineral oil or mineral oil distillate containing 0.001 to 0.5% by weight (based on mineral oil or mineral oil distillate) of a terpolymer of claim 1 and the norbornene derivative is 5-methylnorbornene.

* * * * *